Figure 1:
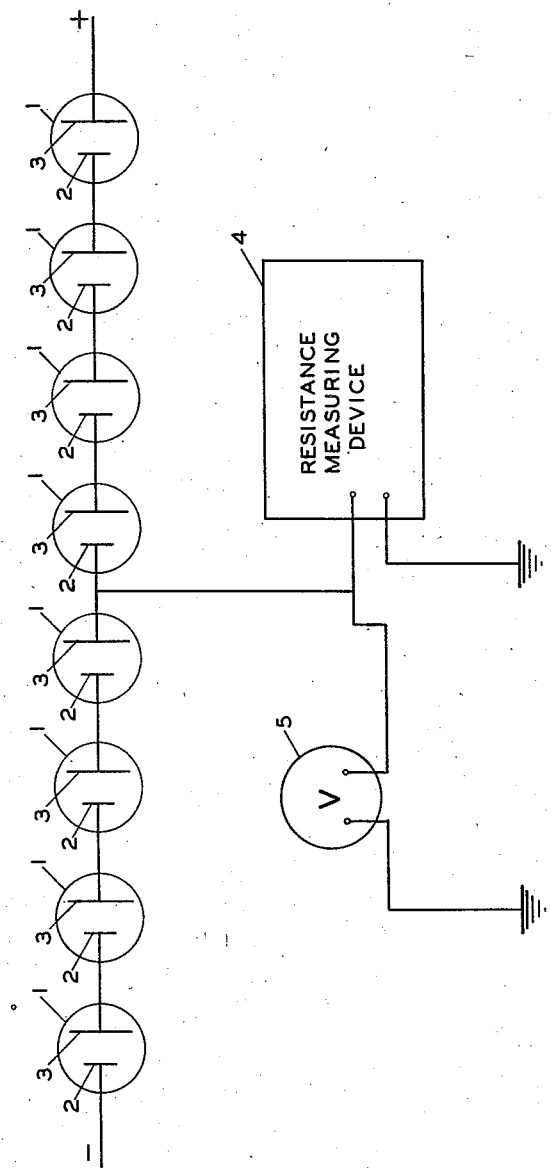

April 25, 1944.  V. F. HANSON  2,347,408

LOCATION OF FAULTS IN ELECTROLYTIC CELL SYSTEMS

Filed April 16, 1942  3 Sheets-Sheet 1

INVENTOR.
VICTOR F. HANSON
BY
ATTORNEY.

April 25, 1944.  V. F. HANSON  2,347,408

LOCATION OF FAULTS IN ELECTROLYTIC CELL SYSTEMS

Filed April 16, 1942   3 Sheets-Sheet 3

*INVENTOR.*
VICTOR F. HANSON
BY
*ATTORNEY.*

Patented Apr. 25, 1944

2,347,408

UNITED STATES PATENT OFFICE 2,347,408

LOCATION OF FAULTS IN ELECTROLYTIC CELL SYSTEMS

Victor F. Hanson, Youngstown, N. Y., assignor to E. I. du Pont de Nemours & Company, Wilmington, Del., a corporation of Delaware Application April 16, 1942, Serial No. 439,224

3 Claims. (Cl. 175—183)

This invention relates to the operation of systems of electrolytic cells operating on direct current and more particularly to the location of ground faults in such systems.

In systems of electrolytic cells a group or bank of electrolytic cells usually consists of a number of cells connected in series, the ends of the bank being connected to a suitable source of direct current, for example a rotary converter. Normally in such systems, the entire direct current circuit is insulated from ground. However, in practice it is impossible to maintain perfect insulation and under the best of operating conditions there is always likely to be a certain small amount of leakage of electric current to ground from various parts of the cell circuit. So long as such leakage is small, it is not particularly disadvantageous. However, if a fault occurs anywhere in the system which permits a considerable amount of current to leak to the ground, serious disadvantages may result. Such serious leakages of current may, for example, create serious operating hazards and operators in contact with the ground may receive serious shocks when coming into contact with parts of the cell circuit. Also the flow of large amounts of current to ground causes serious electrolytic corrosion of equipment. Further, it constitutes an unnecessary waste of electric current. It is therefore very desirable to promptly locate a point at which any such serious leakage of current occurs so that the condition may be quickly cured. The location of such current leakage is often very difficult to find by any visual inspection and heretofore there has been no adequate method of locating such faults except by means of visual inspection or laborious tests which require undue periods of time to accomplish. The problem of detecting and locating such ground faults is almost wholly confined to the cell bank, since other parts of the D. C. circuit are relatively easy to maintain in substantially perfectly insulated condition.

An object of the present invention is to provide a quick and easy method for locating ground faults in electrolytic cell systems. Another object is to provide a means for promptly detecting the existence of such ground faults and to determine the extent of ground leakage at such faults. Another object is to provide an improved method and apparatus for measuring the resistance between an electrolytic cell circuit and ground, and thereby to readily detect the existence and degree of any ground leakage. Still other objects will be apparent from the following description.

The above objects are attained in accordance with the present invention by periodically measuring the resistance between the electrolytic cell, D. C. circuit and ground and measuring the voltage at a selected point between the cell circuit and ground and, from the results of these periodic measurements, determining the degree and location of the current leakage by a simple computation. Various known electrical instruments may be utilized for the purpose of making said measurements and the present invention is not restricted to any particular method or apparatus for making such measurements. However, the efficacy of the invention will depend upon the accuracy with which such measurements are made and hereinafter certain preferred methods for making these measurements and apparatus are described.

The extent of ground leakage is measured by the total resistance of the cell circuit to ground and this may be measured at any desired point in the cell circuit. In order to locate the position of the ground fault according to my invention, the voltage measurement must be made at a selected point in the cell circuit. Ordinarily I prefer to measure the voltage at the midpoint of a cell bank consisting of a group of cells connected in series.

If a cell system comprising a bank of an even number of cells, for example 8 cells connected in series, is perfectly insulated from the ground, the resistance between the cell system and ground will be infinity and the voltage between the cell circuit measured at the midpoint in the cell bank and the ground will be 0. If now leakage to ground occurs, for example, in one of the cells between the midpoint and the positive end of the bank, a voltmeter connected to ground at the midpoint will show a reading of negative voltage. Thus, the negative reading on the voltmeter will indicate that the fault has occurred on the positive side of the cell bank. If now the resistance between the cell bank and the ground is measured, it will be found to be less than infinity and if the aforesaid fault is the only fault in the system, this resistance will be the resistance of the fault and thereby indicate the extent of ground leakage.

However, as stated above, normally there will be a number of small leakages in the cell system, usually more or less distributed throughout the entire cell bank. Such small leakages are not of serious consequence and usually may be disregarded. However, these small leakages will result in a resistance to ground of the cell bank which is of finite quantity and a voltage to ground at the midpoint of the bank which will be 0 only when the leakages are equal on both sides of the midpoint. If, however, in such a normal cell system a large cell leakage occurs at any point in the bank, the total resistance of the cell bank will correspondingly decrease and there will be a corresponding positive or negative reading on a voltmeter connected to ground at the midpoint. Therefore by periodically measuring the resistance and voltage as aforesaid, I am able to promptly detect any such large leakage by comparison of the readings obtained. Moreover, I have found that I can promptly locate the position of the fault by application of the following formula:

$$N = \frac{E_0 R - E R_0}{e(R_0 - R)}$$

where $N$ = number of cells from the point at which the voltage was measured to the position of the fault.

$E_0$ = voltage to ground of the cell bank before fault occurred, measured at a selected point.

$E$ = voltage to ground of the cell bank after fault occurred, measured at the same point as $E_0$.

$R_0$ = resistance of the cell bank before fault occurred.

$R$ = resistance of the cell bank after fault occurred.

$e$ = voltage drop per cell.

The above formula assumes that the voltage drop ($e$) from cell to cell in the series-connected bank of cells is substantially the same throughout the bank. This is substantially true for the conventional bank of cells wherein the electrolyte, current density and other cell characteristics are substantially the same throughout the cell bank. The relatively small differences in individual cell voltages which may occur throughout the cell bank cause only a negligible error in the use of the above formula.

The extent of ground leakage at the fault is indicated by the resistance readings, and can be determined in terms of the resistance of the fault by application of the following formula:

$$R_x = \frac{R_0 R}{R_0 - R}$$

where $R_0$ and $R$ have the same meaning as indicated in the previous paragraph and $R_x$ is the resistance of the fault.

In an electrolytic installation which comprises a number of separate cell banks having cells connected in series, it is often preferable to utilize a single voltmeter or single resistance measuring instrument for the entire group and this may be done by providing the necessary connections from the various cell banks to a multiple switch at the instruments, which are placed in a central or convenient location.

For the utilization of my invention it is not essential that the voltage be measured at the midpoint of the cell bank, provided that the voltage is measured at the same point before and after the occurrence of the ground leakage fault which is thereby indicated and located. The value N will be the number of cells from the point at which the voltage measurements are made. The resistance of the cell bank to ground may be measured at any desired point, not necessarily the same point before and after the occurrence of the fault.

The appended drawings are diagrammatic illustrations of electrolytic cell systems showing the application to such systems of devices for measuring the voltage and resistance as above described. With reference to Figure 1, a cell bank is illustrated which consists of 8 cells 1 connected in series, the cell bank being connected to a source of D. C. current not shown. Each cell has anodes 3 and cathodes 2. The cell bank is connected to a suitable resistance measuring device 4 and a voltmeter 5, these in turn being connected to ground.

Figure 2:
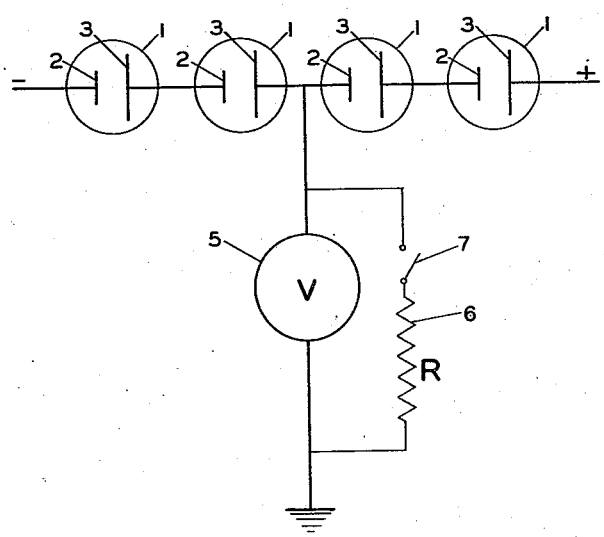

Figure 2 illustrates a particular device for measuring both the voltage to ground and the resistance of the cell bank to ground. This consists of voltmeter 5 provided with a shunt circuit which contains shunt resistance 6 and shunting switch 7 which may be a single pole, single throw switch, or any other conventional switch of suitable design. Shunt resistance 6 is a resistance of known value. When switch 7 is open, the voltage to ground may be read from voltmeter 5. When switch 7 is then closed, the voltage as shown on the voltmeter will be different because of the shunt resistance. The resistances of the cell bank to ground before and after occurrence of the fault then may be determined by computation from the following formulas:

$$R_0 = R_s \cdot \frac{E_1 - E_2}{E_2}$$

and $$R = R_s \cdot \frac{E_3 - E_4}{E_4}$$

where:

$R_0$ = resistance of the cell bank to ground before fault occurred.

$R$ = resistance of the cell bank to ground after fault occurred.

$E_1$ = Voltage of cell bank to ground (switch 7 open) before fault occurred.

$E_2$ = shunted voltmeter reading (switch 7 closed) before fault occurred.

$E_3$ = voltage of cell bank to ground (switch 7 open) after fault occurred.

$E_4$ = shunted voltmeter reading (switch 7 closed) after fault occurred.

The location of the fault then may be determined as described above from the formula:

$$N = \frac{E_0 R - E R_0}{e(R_0 - R)}$$

wherein:

$$E_0 = E_1; \text{ and } E = E_3$$

By mathematical derivation, it is apparent that the value of N may also be determined without separately computing the values of $R_0$ and $R$, i. e., by using the following formula:

$$N = E_2 E_3 \frac{(E_1 + E_4) - E_1 E_4 (E_2 + E_3)}{e(E_1 E_4 - E_2 E_3)}$$

One disadvantage of the method of measuring the cell bank resistance as illustrated by Figure 2 is that occasionally the voltage reading may be zero because of balanced leakage conditions in the cell bank. In such cases, it is necessary to change the location of the instrument so as to take the voltage readings at some point other than the midpoint of the cell bank. Also this method usually is not as accurate as other methods hereinafter described.

Figure 3:
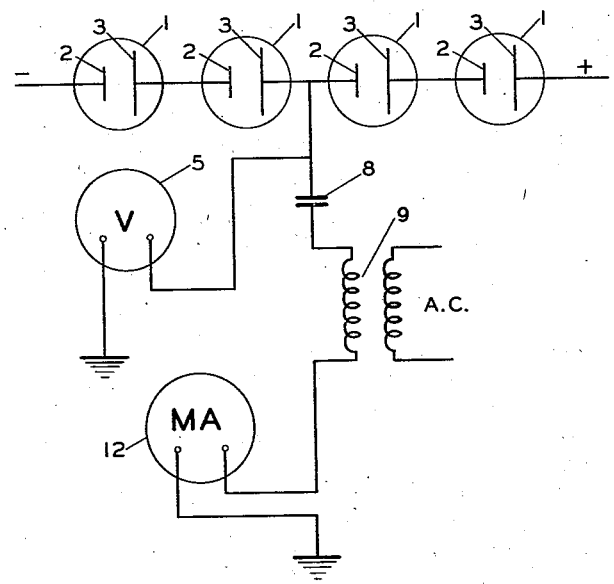

Figure 3 represents a preferred method and apparatus for measuring resistance of the cell bank independently of voltage measurements. The cell bank consisting of cells 1 is connected with grounded voltmeter 5 and with a separate circuit for measuring resistance of the cell bank to ground. The resistance measuring circuit comprises condenser 8, constant voltage transformer 9 adapted to provide a constant voltage alternating current, at a suitable voltage, for example 10–15 volts, and milliammeter 12. The elements 8, 9 and 12 are connected in series between the cell bank and ground. The order in which these three elements are connected in this circuit is not important and any desired order may be utilized. For example, milliammeter 12 may be connected directly to the cell bank circuit and thence to the secondary of transformer 9 and the latter may be connected directly through condenser 8 to the ground. Other conventional electrical devices, including resistances of known value, variable resistances, or adjustable resistances may be inserted in the circuit if desired, but these are not essential. The milliammeter 12 may be calibrated in terms of ohms so that the resistance may be read directly from the instrument. This may be done, for example, by inserting a suitable variable resistance in the circuit in series with the milliammeter, temporarily grounding the circuit at a point near the cell blank and adjusting the variable resistance to set the milliammeter needle at zero on the dial. The temporary ground may then be replaced successively by resistances of known value and the corresponding values marked on the dial of the milliammeter as indicated by the instrument. In this manner the dial of the instrument may be calibrated in values from 0 to infinity and is then ready for use. Obviously, readings on voltmeter 5 and milliammeter 12 may be taken simultaneously.

Figure 4:
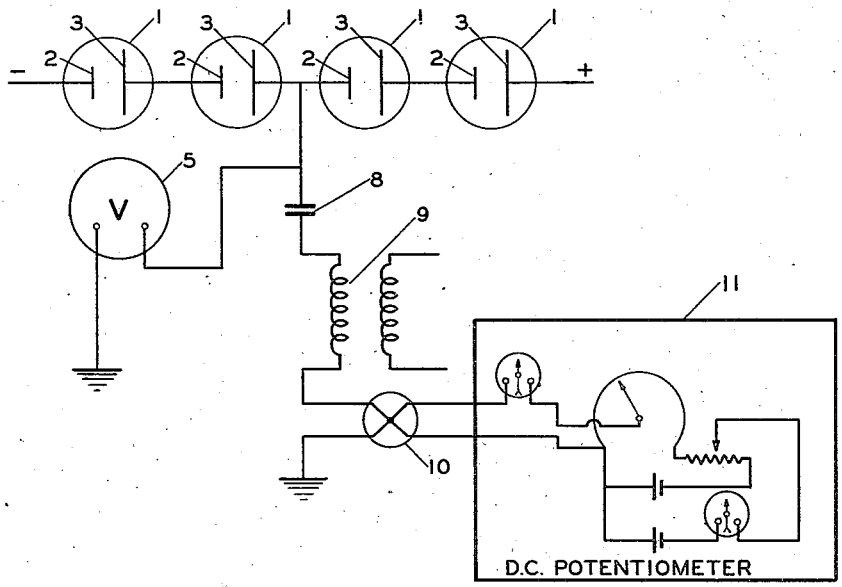

Figure 4 illustrates another preferred modification of my invention, which is similar to that of Figure 3 except that in place of milliammeter 12, the resistance is measured by a D. C. potentiometer 11 which is activated by current from a conventional vacuum thermocouple 10. The D. C. potentiometer 11 is merely illustrated diagrammatically in the drawing and any conventional D. C. potentiometer or millivoltmeter will be suitable for my purpose.

Figure 5:
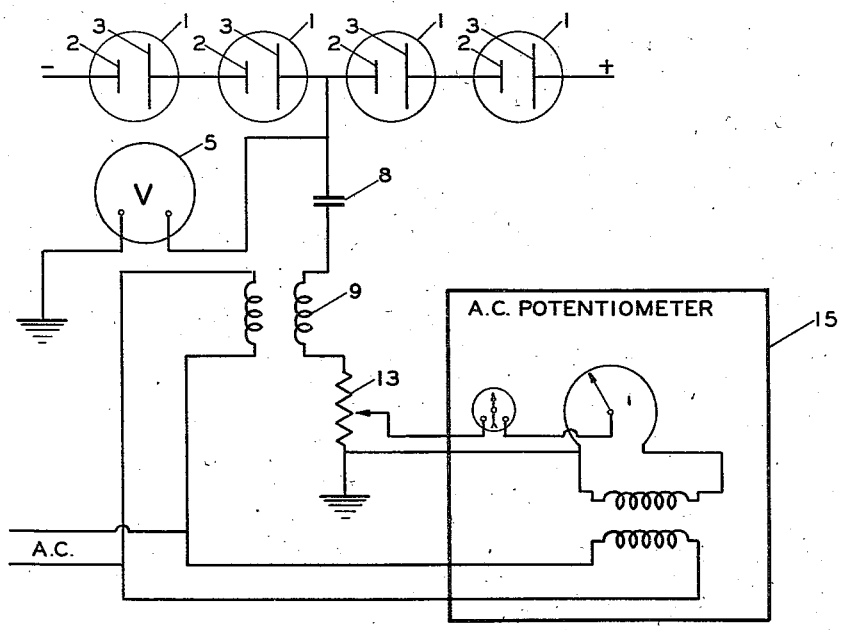

Figure 5 illustrates a further preferred modification, wherein milliammeter 12 of Figure 3 is replaced by an A. C. potentiometer of conventional design. The resistance measuring circuit in Figure 5 comprises condenser 8, constant voltage transformer 9, variable resistance 13 for setting the potentiometer and the A. C. potentiometer 15. As shown in these drawings, potentiometer 15 and transformer 9 are fed from the same source of A. C. current, but this is not essential.

In a preferred method of practicing my invention, I utilize conventional electrical instruments which are adapted to make graphic records of the voltage and resistance, measured continuously or periodically. Thus for example, voltmeter 5 as shown by the drawings may be a recording voltmeter of conventional type. Likewise for example, I may utilize a conventional recording potentiometer in the circuits illustrated in Figures 4 and 5. Inspection of graphic records produced by such instruments enables the cell operator to detect the existence of a ground leakage fault. By providing the instruments with suitably calibrated recording paper, operators are able to measure the voltage and resistance and from such measurements the location and extent of the ground fault can be rapidly determined. Also by means of an automatic, mechanically operated switch device of conventional design, a single instrument may be utilized to periodically record readings for a plurality of cell banks. Utilizing a circuit as shown in Figure 4, a single recorder can be utilized to measure and record both voltage and resistance of one or more banks of cells.

I claim:

1. The method for locating an electrical ground fault in a bank of series-connected electrolytic cells normally insulated from ground which comprises measuring the resistance between the cell bank and ground before and after said fault occurred, measuring the direct current voltage between the cell bank and ground at a selected point in the bank before and after said fault occurred, and determining the location of said fault by computation from the results of said measurements.

2. The method for locating an electrical ground fault in a bank of series-connected electrolytic cells normally insulated from ground which comprises measuring the resistance between the cell bank and ground before and after said fault occurred, measuring the direct current voltage between the cell bank and ground at a selected point in the bank before and after said fault occurred, and determining the location of said fault by computation from the formula:

$$N = \frac{E_0 R - E R_0}{e(R_0 - R)}$$

when $N$ = number of cells from said selected point,
$E_0$ = voltage to ground at said selected point before said fault occurred,
$E$ = voltage to ground at said selected point after said fault occurred,
$R_0$ = resistance to ground before said fault occurred,
$R$ = resistance to ground after said fault occurred, and
$e$ = average voltage-drop per cell.

3. The method for locating an electrical ground fault in a bank of series-connected electrolytic cells normally insulated from ground which comprises measuring the resistance between the cell bank and ground before and after said fault occurred, measuring the direct current voltage between the cell bank and ground at a selected point in the bank before and after said fault occurred, and determining the location of said fault by computation from the formula:

$$N = \frac{E_0 R - E R_0}{e(R_0 - R)}$$

when:

$N$ = number of cells from said selected point,
$E_0$ = voltage to ground at said selected point before said fault occurred,
$E$ = voltage to ground at said selected point after said fault occurred,
$R_0$ = resistance to ground before said fault occurred,
$R$ = resistance to ground after said fault occurred,
$e$ = average voltage-drop per cell,
and determining the direction of the location of said fault from said selected point by observing the sign of said voltage as measured after said fault occurred.

VICTOR F. HANSON.